United States Patent
Yang et al.

(10) Patent No.: US 6,309,488 B1
(45) Date of Patent: Oct. 30, 2001

(54) MANUFACTURING METHOD FOR HIGH PRECISION MOLD

(75) Inventors: Hsi-Harng Yang; Shih-Chou Chen, both of Hsinchu; Chuan-Kang Mu, Taichung; Jauh-Jung Yang, Taipei, all of (TW)

(73) Assignee: Industrial Technology Research Institute (TW)

( * ) Notice: Subject to any disclaimer, the term of this patent is extended or adjusted under 35 U.S.C. 154(b) by 0 days.

(21) Appl. No.: 09/447,716

(22) Filed: Nov. 23, 1999

(51) Int. Cl.[7] .................................................. B32B 31/16
(52) U.S. Cl. ........................ 156/73.1; 156/150; 156/242
(58) Field of Search .................................. 156/73.1, 150, 156/242, 272.2; 264/401, 405, 442, 443, 445

(56) References Cited

U.S. PATENT DOCUMENTS

| | | | |
|---|---|---|---|
| 5,269,998 | * 12/1993 | Takagi et al. ..................... | 264/328.1 |
| 5,389,312 | * 2/1995 | Lebby et al. ....................... | 264/1.24 |
| 5,482,451 | * 1/1996 | Johnson et al. ..................... | 425/116 |
| 5,786,002 | * 7/1998 | Dean et al. ......................... | 425/183 |
| 6,071,442 | * 6/2000 | Dean et al. ......................... | 264/1.25 |
| 6,074,577 | * 6/2000 | Katsura et al. ..................... | 264/1.25 |

* cited by examiner

Primary Examiner—James Sells

(57) ABSTRACT

A manufacturing method for a high precision mold comprises the steps of (a) placing a plastic body on a conductor substrate, (b) forming a plurality of perforating apertures in the plastic body using X-ray deep etching molding, (c) rounding the edges at the front end of the perforating apertures using ultraviolet (UV) lithography, and (d) electroforming the high precision mold using the plastic body with perforating apertures as a model. A fiber connector sleeve can be further manufactured by (e) molding a fiber aligning element using the high precision mold, (f) molding a fiber sleeve body using an usual mold, and (g) combining the fiber aligning element with the fiber sleeve body using ultrasonic waves to form the fiber connector sleeve.

10 Claims, 5 Drawing Sheets

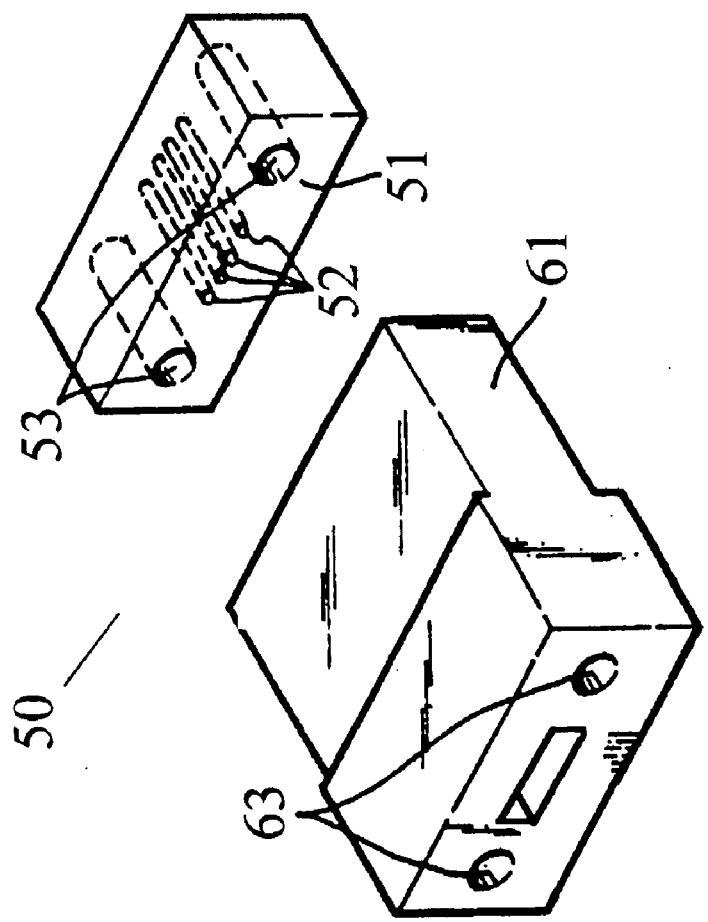

MANUFACTURING METHOD FOR HIGH PRECISION MOLD

BACKGROUND OF THE INVENTION

1. Field of Invention

This invention relates to a manufacturing method for a high precision mold and to a manufacturing method for a multi-fiber ferrule by combining different parts of the multi-fiber ferrule made from molds.

2. Related Art

As the science progresses, a large amount of information has to be transmitted among people via internet. An optical fiber (fiber) has been chosen as a better transmission medium for the information. However, due to the limitation of the fiber, separated sectors will exist between fibers. The fiber connector (ferrule) is then used to connect these separated sectors. FIG. 1 shows a conventional multi-fiber connector, which is used to make a continuous braid type multi-fiber network and comprises a connector sleeve 1 made into a single body and a fixing element 2. The connector sleeve 1 is provided with a plurality of fiber aligning apertures and two pin aligning apertures for aligning pins. The errors on the diameter of each fiber aligning aperture and the span between the fiber aligning apertures are required to be within 1 $\mu$m.

The U.S. Pat. No. 5,786,002 "Guide block assembly for aligning bore forming pins during molding of multi-fiber optical connector ferrules" provides an assembly made of single-piece polished separate guide elements as the mold of a molding fiber sleeve. As shown in FIG. 2, the mold disclosed by this patent comprises a plurality of closely placed guide elements 22 with fiber aligning apertures provided thereon, pin aligning guide elements 24 with pin aligning apertures formed thereon and disposed on both sides of the closely placed guide elements 22, and elements 26a, 26a formed on the top and bottom surfaces of the closely placed guide elements 22 for supporting.

However, the above method requires high precision polishing on each guide element 22, the pin aligning guide elements 24, and the elements 26a, 26b before combining them together into the mold. This is not only expensive in cost but also not practical for mass production.

SUMMARY OF THE INVENTION

In viewing of the foregoing problems, it is an object of the present invention to provide manufacturing method for a high precision mold.

It is another object of the present invention to provide a manufacturing method for a separate type fiber connector sleeve.

The instant invention provides a manufacturing method for a high precision mold, which comprises the steps of providing a plastic body on a conductor substrate; forming a plurality of perforating apertures in the plastic body using X-ray deep etching molding (LIGA technology); forming a rounded edge at the front end of the perforating apertures in the plastic body using ultraviolet (UV) lithography, and electroforming the high precision mold using the plastic body with perforating apertures as the model.

The present invention also provides a manufacturing method for a fiber connector sleeve, which comprises the steps of forming a fiber aligning element using a high precision mold by ejection or by heat pressing, forming a fiber sleeve body using a usual mold by ejection or by heat pressing, and combining the fiber aligning element with the fiber sleeve body using ultrasonic waves to form the fiber connector sleeve.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow illustration only, and thus are not limitative of the present invention, and wherein:

FIG. 8 is a perspective view of a separate type fiber connector sleeve formed with a high precision mold of the instant invention.

DETAILED DESCRIPTION OF THE INVENTION

Referring to FIGS. 3 to 7, they show the steps in details of a manufacturing method for a high precision mold according to the present invention. The high precision mold 30 is made by first forming a plurality of necessary perforating apertures in a plastic body 10 using X-ray deep etching molding (LIGA technology), then electroforming the high precision mold 30 using the plastic body 10 as a model. Since the exposure and developing method can form a precise photoresistor pattern on the plastic body 10, and the X-ray deep etching molding technology can form fairly vertical walls in the plastic material (acryl), therefore very vertical perforating apertures can be formed with the precision required.

Figure 1:
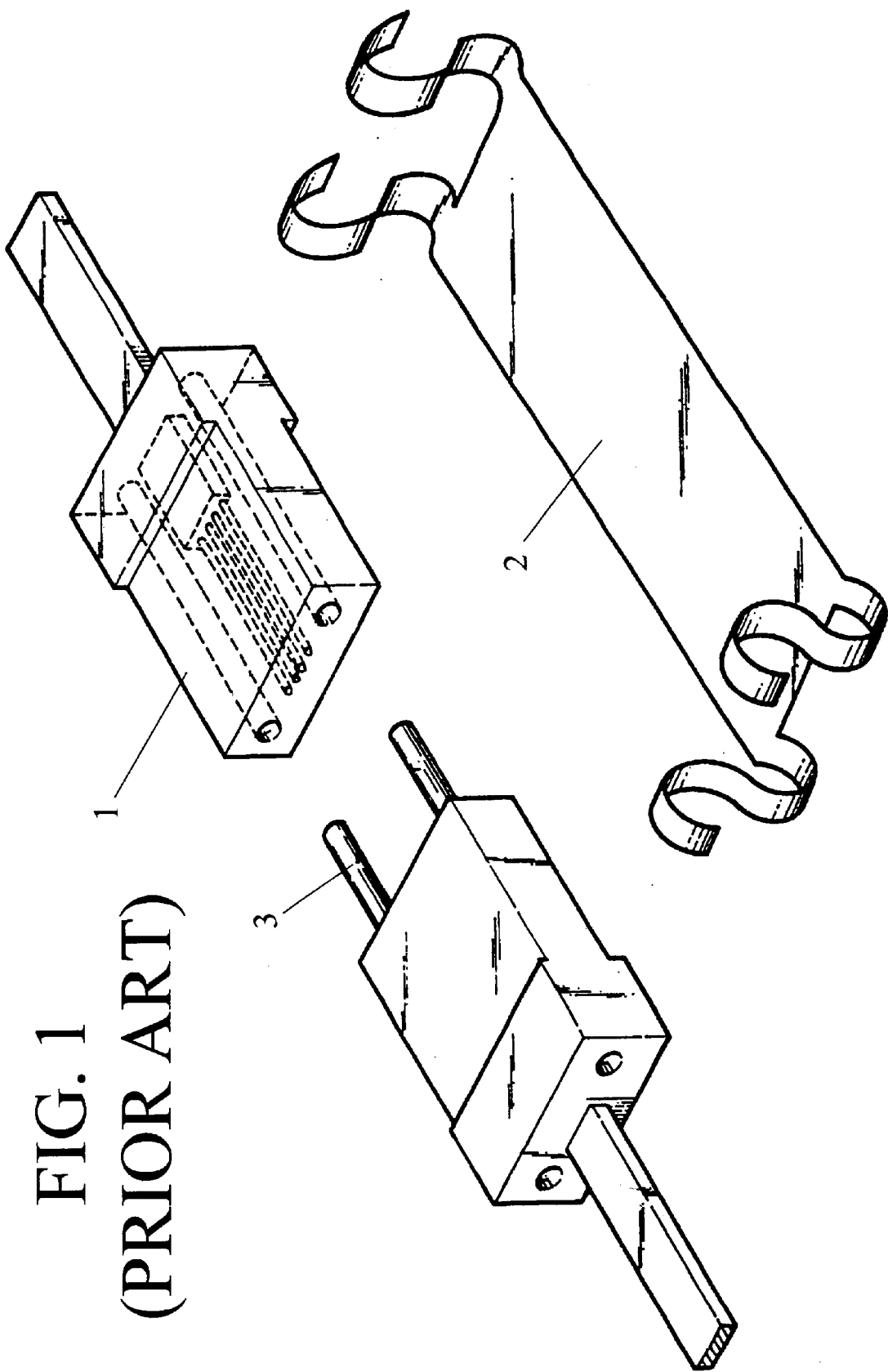
FIG. 1 is a perspective view of a conventional fiber connector.
Figure 2:
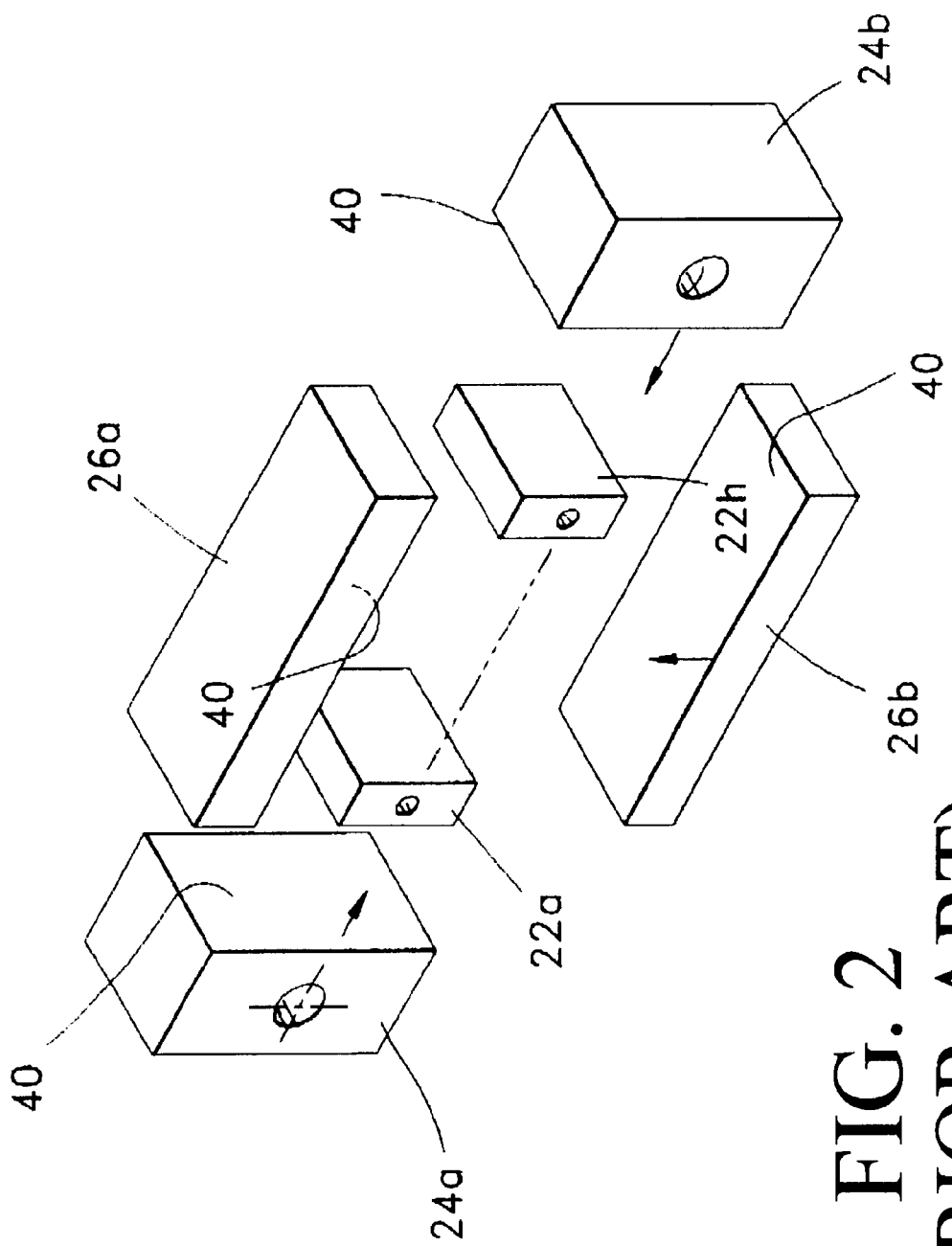
FIG. 2 is a perspective view of a conventional mold for molding a fiber connector sleeve.
Figure 3:
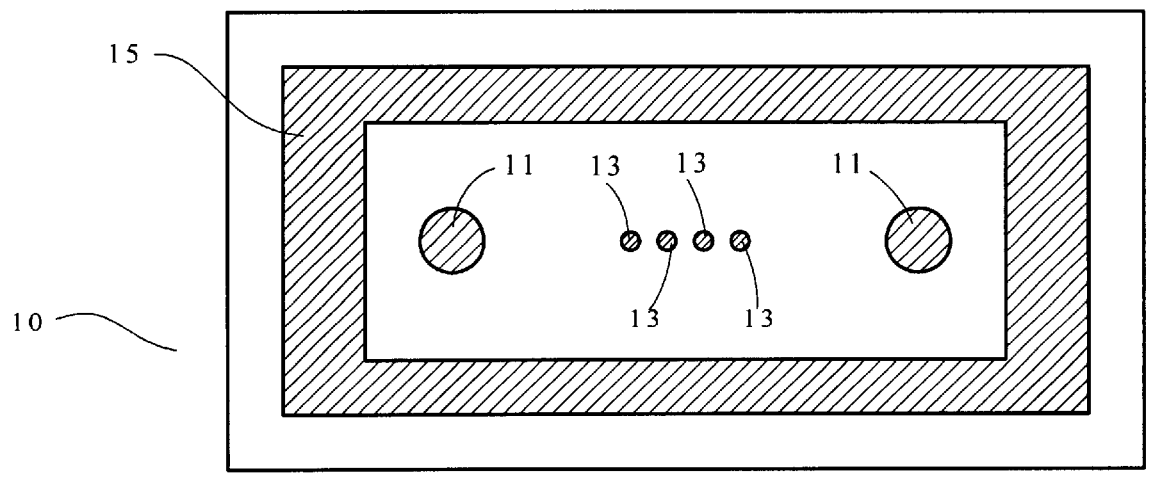
FIG. 3 is a top view of the photoresistor pattern formed on a plastic body in the procedure of making a high precision mold according to the present invention.
Figure 4:
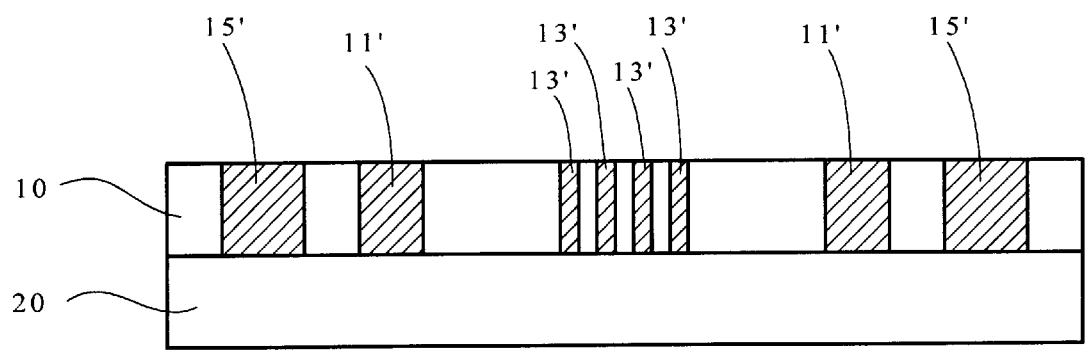
FIG. 4 is a cross-sectional view of a plastic body after the X-ray deep etching molding in the procedure of making a high precision mold according to the present invention.
Figure 5:
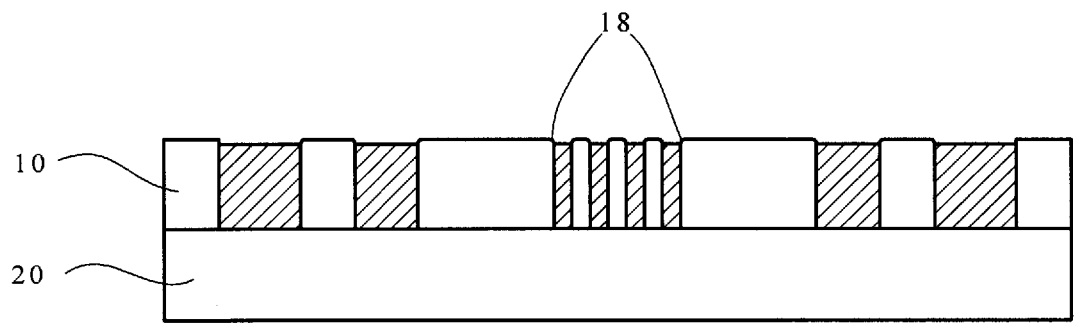
FIG. 5 is a cross-sectional view of a plastic body after the UV lithography in the procedure of making a high precision mold according to the present invention.
Figure 6:
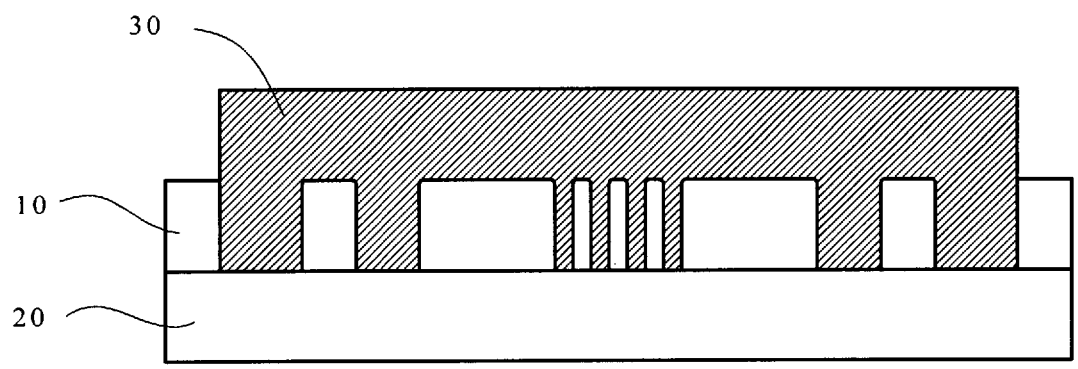
FIG. 6 is a cross-sectional view of a plastic body with electroformed high rigidity material formed thereon in the procedure of making a high precision mold according to the present invention.
Figure 7:
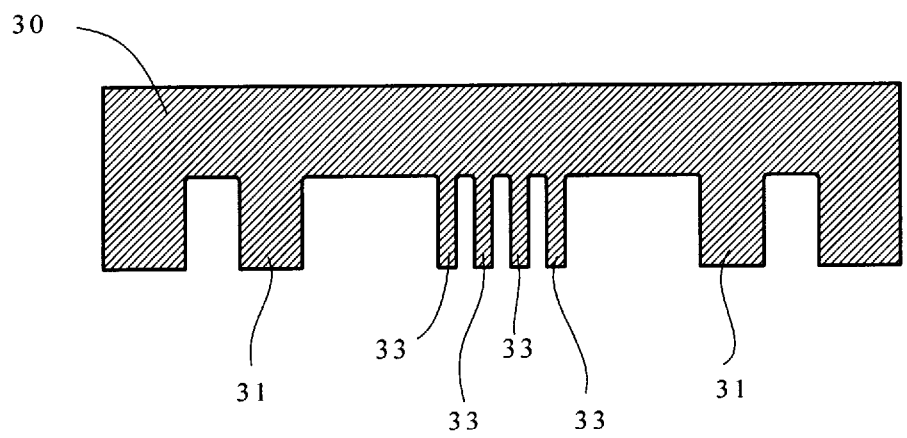
FIG. 7 is a cross-sectional view of a high precision mold according to the present invention.

The manufacturing method for the high precision mold 30 is as follows:

step 1: placing the plastic body 10 on a conductor substrate 20, the plastic body 10 could be an acrylic material;

step 2: forming a photoresistor pattern on the top surface of the plastic body 10, for example, forming photoresistor in the area other than fiber aligning apertures 13, pin aligning apertures 11, and shape boundaries 15, as shown in FIG. 3;

step 3: performing deep etching from top of the plastic body 10 using X-ray so as to form fiber aligning apertures 13' and pin aligning apertures 11', as shown FIG. 4, the apertures are made through the plastic body 10;

step 4: forming a rounded edge 18 at the front end of the fiber aligning apertures 13' and the pin aligning apertures 11' using the ultraviolet (W) overdeveloping method, as shown in FIG. 5. The rounded edge 18 can serve as the guiding aperture for guiding the fiber into a sleeve molded; 5, please amend the paragraph beginning on line 5 as follows:

step 5: electroforming a high precision mold 30 using the plastic body 10 as a model, as shown in FIG. 6, wherein the electroforming material can be an highly rigid alloy of nickel and cobalt or an granule added nickel base alloy, and removing the conductor substrate 20 and the plastic body 10 from the high precision mold 30.

Therefore, using the above mentioned method in fabricating a high precision mold 30 can meet the precision required. That is, the errors of the diameter of the fiber aligning aperture and the aperture span are within 1 µm. This is not only convenient for mass production but also cost effective.

Please refer to FIG. 8. The fiber connector sleeve 50 is divided into two parts, namely a fiber aligning part (front end) 51 and a sleeve body (rear end) 61. Since the fiber aligning part 51 is the main part of a fiber connector, it can limit the errors of the diameter of the fiber aligning aperture and the aperture span within lam by molding the fiber aligning part 51 using the high precision mold 30. On the other hand, the sleeve body 61 can also be molded using another mold prepared by the above mentioned method (or the usual method). Finally, the fiber connector sleeve 50 can be made by combining the fiber aligning part 51 with the sleeve body 61 using ultrasonic waves. The fiber aligning part 51 has four fiber aligning apertures 52 and two pin aligning apertures 53, meanwhile the sleeve body 61 also has two pin aligning apertures 63 with respect to the pin aligning, apertures 53. The surface with guiding rounded edges of the fiber aligning part 51 is facing and connected with the sleeve body 61 to serve as a guiding aperture for guiding a fiber into the fiber connector sleeve 50. Since combining the fiber aligning part 51 with the sleeve body 61 using ultrasonic waves will not affect the required precision for the diameter of the fiber aligning aperture and the aperture span, the fiber connector sleeve 50 can still maintain the required precision.

The high precision mold used in molding a fiber connector sleeve according to the instant invention is manufactured by forming necessary aligning apertures in a plastic body using X-ray deep etching molding technology and electroforming the mold using the plastic body as a model. In addition, using separate molds to make different parts of a fiber connector sleeve, such as the fiber aligning part and the sleeve body, is good for the precision required in the mold formation by ejection (molding). Finally, the different parts are combined together. This method is easy in manufacturing the molds needed, on the other hand, it is also easy to make the fiber aligning part and the sleeve body by molding. The success rate and production efficiency can be increased to ensure that the fiber connector loss is decreased to the least.

Although the above embodiment is used to illustrate the contents of the invention, it should not be construed as a limitation of the invention. Various changes or modifications can be made to this embodiment without departing from the essence of the invention. For example, the fiber connector is not limited to the model shown in the drawings, and this method can be applied to the manufacture of various types of multi-fiber connector sleeves.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a high precision mold, comprising the steps of:

a) providing a plastic body having upper and lower surfaces, and placing the lower surface of the plastic body on a conductor substrate;

b) forming a plurality of perforating apertures in the plastic body using X-ray deep etching technology, each of the perforating apertures extending from an opening formed on the upper surface to the lower surface;

c) rounding edges of the openings of the perforating apertures of the plastic body using ultraviolet (UV) lithography; and d) electroforming the high precision mold using the plastic body as a model.

2. The manufacturing method of claim 1, wherein said plastic body is made from acryl.

3. The manufacturing method of claim 1, wherein an electroformed source material used in said electroforming step is a high rigidity alloy of nickel and cobalt.

4. The manufacturing method of claim 1, wherein an electroformed source material used in said electroforming step is a granule added nickel alloy.

5. A method of manufacturing a multi-fiber connector sleeve, comprising the steps of:

a) providing a plastic body having upper and lower surfaces, and placing the lower surface of the plastic body on a conductor substrate;

b) forming a plurality of perforating apertures in the plastic body using X-ray deep etching technology, each of the perforating apertures extending from an opening formed on the upper surface to the lower surface;

c) rounding edges of the openings of the perforating apertures of the plastic body using ultraviolet (UV) lithography;

d) electroforming a high precision mold using the plastic body as a model;

e) molding a fiber aligning element using the high precision mold;

f) molding a fiber sleeve body; and g) combining said fiber aligning element with said fiber sleeve body using ultrasonic waves to form said multi-fiber connector sleeve.

6. The method of claim 5, wherein said fiber sleeve body is molded using another high precision mold manufactured by steps a) through d).

7. The method of claim 1, further comprising the step of removing the plastic body and the conductor substrate from the electroformed high precision mold.

8. The method of claim 1, wherein the perforating apertures comprise fiber and pin aligning apertures.

9. The method of claim 1, further comprising, the step of forming, before said electroforming step, a boundary channel extending from the upper surface to the lower surface of the plastic body and surrounding the perforating apertures.

10. The method of claim 9, further comprising the step of rounding inner peripheral edges, on the upper surface of the plastic body, of the boundary channel.

* * * * *